Feb. 2, 1960 — R. ADELL — 2,923,404

CONTAINER FOR ALCOHOLIC BEVERAGES

Filed Aug. 30, 1956

INVENTOR.
ROBERT ADELL
BY Gregory S. Dolgorukov
ATTORNEY.

United States Patent Office 2,923,404
Patented Feb. 2, 1960

2,923,404

CONTAINER FOR ALCOHOLIC BEVERAGES

Robert Adell, Detroit, Mich.

Application August 30, 1956, Serial No. 607,034

4 Claims. (Cl. 206—56)

This invention relates to containers for alcoholic beverages and particularly, but not exclusively, for such beverages subject to a tax evidenced by revenue stamps.

For a great many years alcoholic beverages have been distributed packaged in bottles. In fact, at the present time such packaging of alcoholic beverages is not only universal but is virtually exclusive, and is considered to be the most practical way to package such beverages. Resistance offered by glass to the chemical and dissolving action of alcohol, and imperviousness of glass to liquids and vapors have been the main reasons for considering glass to be superior to any other materials for such purposes.

Use of a bottle having an opening at its top for pouring the contents in and for dispensing the same necessitates provision of closing means such as a cork or a cork-lined metal cap to close such opening. Closing the bottle with any of such means and maintaining it closed also presented a problem to the solution of which much inventive effort has been directed. In addition, opening such bottles have also presented difficulties, and a large number of various bottle opening devices, ranging from a common cork screw to various types of openers for taking off cork-lined metal caps, have been devised. These problems induced those skilled in the art to work on such closing means that would provide an air tight seal and yet be simple and easy to close and to open without the necessity of discarding the closing device after opening the bottle and using up its contents, as is done with corks and metal caps. A number of such devices having means which are not expendable at each opening, such as a porcelain cap with a rubber gasket, screw-on caps, and the like, have been offered. Nevertheless, bottle-closing means are usually expendable with each bottle and constitute waste.

In adidtion, an elaborate label is usually provided on bottles to designate their contents, to improve appearance, and to impart a desired color scheme to a bottle, often matching or contrasting the contents. The bottles themselves are often made of artistic design, and some of them are expensive to make.

Since alcoholic beverages represent one of the important sources of internal revenue, a serious problem has been confronted in the necessity to ensure payment of the revenue tax on the contents of each bottle. Since a bottle may be refilled an indefinite number of times, refilling such bottles presents a serious problem as offering possibilities of tax evasion as well as refilling such bottles with adulterated liquors often injurious to health but sold as genuine on the strength of the bottle and the label. Law requires affixing a revenue stamp to the top of the container in such a manner that it is unavoidably invalidated in the process of opening the bottle. There have also been enacted laws forbidding re-use or resale of bottles or other containers for alcoholic beverages. Nevertheless, the nature of bottles and other conventional containers for alcoholic beverages makes possible abuse and tax evasion through the use of old bottles and containers. As a result, loss of revenue each year amounts to a very substantial sum, and serious damage to health is also caused to many persons by sales of adulterated or insufficiently rectified liquors.

Moreover, since, in order to prevent re-use of such bottles, empty wine and hard liquor bottles are usually broken by many restaurants, night clubs and the like, and are thrown away by individual users, a considerable waste is thus produced, and certain hazards created.

It should also be appreciated that bottles for alcoholic beverages are made rather heavy in order to have them sufficiently strong and thus to decrease breakage and loss of the contents as well as the revenue stamp. Consequently, the weight of the bottle compared with the weight of its contents is very substantial and presents, in the product itself, weight that increases the cost of handling and shipping. In addition, because of brittleness of glass, such bottles have to be packaged in substantial cartons and boxes to prevent breakage, and, therefore, the added weight of packaging the bottles increases still further the gross weight of shipments, adding further to the inconvenience and expense.

In mixed drinks and wines, where the value of the contents is lower than in the case of whiskey, the large overhead of packaging and shipping is particularly noticeable. Moreover, with mixed drinks, mixing them at the counter leaves room for considerable variance in the recipes. Such mixing is also time-consuming, interferes with orderly operation of establishments in rush hours, may not always be fully sanitary and is not conducive to proper accounting. Having on hand from day to day a number of half full bottles is also undesirable for a number of other reasons.

One of the objects of the present invention is to provide an improved package or container for alcoholic beverages, whereby the above difficulties and disadvantages are overcome and largely eliminated without introducing other problems or increasing the costs involved.

Another object of the present invention is to provide an improved package or container for alcoholic beverages, said container while being made in the form of an envelope from a pliable sheet material, is impervious to the liquid and vapor of the contents as well as those of the outside air and provides an air tight seal eliminating possibilities of evaporation or dilution of its contents.

A further object of the present invention is to provide an improved package or container for alcoholic beverages susceptible of simple and effective sealing without the use of additional bodies such as corks, cork-lined caps, porcelain-plugs with rubber gaskets, and the like.

A further object of the present invention is to provide an improved package or container for alcoholic beverages which can be opened without the use of any special tools such as cork screws, bottle openers, and the like, and without use of expendable closing means such as corks, caps and the like.

A still further object of the present invention is to provide an improved package or container for alcoholic beverages which become wholly unuseable after having been once opened, and which cannot be refilled or resealed.

A still further object of the present invention is to provide an improved package or container for alcoholic beverages subject to tax, payment of which is evidenced by a revenue stamp, on which container the revenue stamp may be printed directly on the container or sealed within the wall thereof and becomes wholly unuseable and invalidated after the package has once been opened.

A still further object of the present invention is to provide an improved package or container for alcoholic beverages, which is adapted to receive a label by printing process and produces an exceedingly bright print protected from elements as well as from chemical action of the contents, without the need of any special protective coatings and the like.

A still further object of the present invention is to provide an improved package or container for alcoholic beverages, particularly for mixed drinks, in which a mixed drink of a predetermined and carefully compounded recipe and in predetermined volume, can be delivered to a customer without any mixing at the counter.

A still further object of the present invention is to provide an improved package or container for alcoholic beverages, particularly for mixed drinks, which enables easy and convenient refrigerating of such beverages in order that the same be served to the consumer chilled. Serving such drinks chilled eliminates the necessity of adding ice which, being made of common tap water, often highly chlorinated and containing other admixtures, not only decreases in melting the proof content of the drink by diluting it but also may completely destroy or alter the bouquet or aroma which may have been carefully developed in such a drink through years of careful aging and through use of specially purified water. Thus, mixed drinks may be served to the consumer in their purest form, retaining their original bouquet and flavor and without any dilution.

A still further object of the present invention is to provide an improved package or container for alcoholic beverages, which is extremely light and not subject to breakage, thus permitting very inexpensive and yet reliable packaging, presenting no danger of breakage.

Further objects and advantages of this invention will be apparent from the following description and appended claims, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention, I provide an improved container for alcoholic beverages in the form of a package or envelope made of pliable laminate plastic material. The composite sheet of such material includes one layer forming the inside surface of the container and made of a material resistant to the action of alcohol, acids and other substances that are contained by alcoholic beverages, and which is impervious to such beverages or their vapors. The other layer of the composite sheet, forming the outside surface of the package, is made of another plastic material possessing other physical and chemical properties not found in the layer forming the inside of the package, such as higher tensile strength, low stretchability and ability to take printing. The inner walls of the container are made preferably of polyethylene plastic which, while possessing excellent chemical resistance properties, does not have by itself sufficient strength to form a package practical for use.

Figure 1:
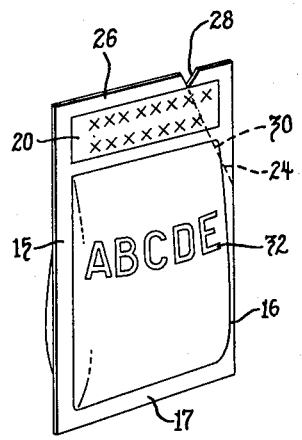
Fig. 1 is a perspective view showing my improved container, filled and sealed.
Figure 2:
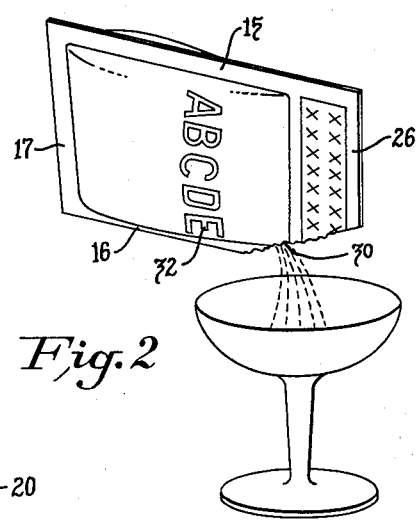
Fig. 2 illustrates pouring of the contents of the container into a glass.
Figure 3:
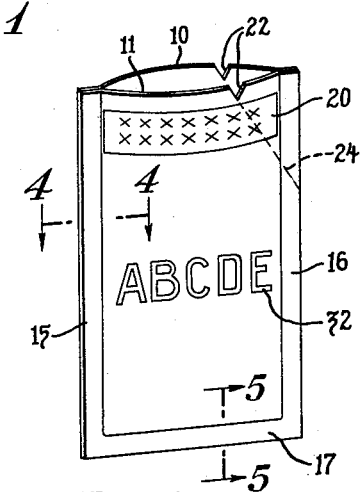
Fig. 3 shows my improved container before the same is filled.
Figure 4:
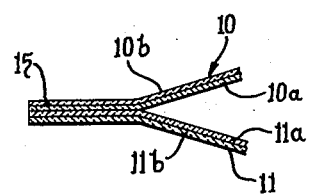
Fig. 4 is a sectional view taken in the direction of the arrows on the section plane passing through the line 4—4 of Fig. 3.

Referring specifically to the drawings, Fig. 1 illustrates my improved package in its sealed form. Referring specifically to Fig. 3 which shows said package before filling and sealing, the package comprises two walls 10 and 11 in which the layers forming the inner surfaces of the package and designated by the numerals 10a and 11a are made of polyethylene plastic of sufficient thickness, while the outside layers thereof designated respectively by the numerals 10b and 11b are made of cellulose acetate sheet.

Figure 5:
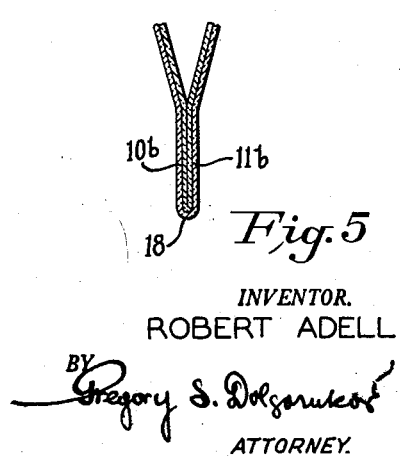
Fig. 5 is a sectional view taken in the direction of the arrows on the section plane passing through the line 5—5 of Fig. 3.

The layers of each wall are bonded together to form a unitary laminate sheet. In the present embodiment of the invention the sides 15 and 16 of the package are formed by fusion sealing of the layers 10a and 11a of the polyethylene plastic, while the bottom 17 is sealed not only by heat fusion of the layers 10a and 11a but also by having the outer sheets 10b and 11b being integral at the bottom of the package, as indicated in Fig. 5 at 18.

On one or both walls of the package there is printed a revenue stamp indicated by the numeral 20. Such stamp may be printed in reverse on the inner side of one or both layers 10b and 11b and appear through the transparent mass of such sheet in the direct form. Notches 22 are provided on the package at the top thereof, extending toward the revenue stamp. A dotted line 24 is printed or pressed in on the package from the notches 22 across the stamp and toward the outside of the package in order to guide the tear as it originates in the notch 22.

When the package is filled and sealed, the walls 10 and 11 form a single combined wall designated by the numeral 26. It will be understood that the single notch 28, thus formed by the two notches 22, may also be cut after sealing of the container. A slit or tab may also be used instead of a notch.

For opening the container, its corner is torn off beginning with the notch 28 to make a small opening as indicated at 30 and thus enable the user to form a pouring spout for pouring the contents and also to irreparably invalidate the revenue stamp 20 by tearing. After the contents of the package are poured out, the container is discarded. I have found by practical experience that the container once used cannot be resealed since polyethylene plastic once acted upon by alcohol will not fuse properly and will spring a leak shortly after such attempted resealing.

On the outside of the package there is provided a suitable legend such as indicated by 32 in the form of the name and the specification of the drink, artistic design, trade name and the trademark of the manufacturer, and the message which the manufacturer wishes to convey to the consumer, or which may be required by law. Such printing is done prior to making the laminate sheets, by printing it in reverse on the inner side of the acetate sheet, making it appear directly through a mass thereof. Such printing not only has a glossy and very bright appearance but, being sealed within the mass of the laminate plastic sheet, is protected from the action of the alcohol contained in the beverage and possible dilution thereby, as well as from being rubbed off, scratched, or diluted by other agents that could act on such printing from the outside. Thus, the printing is fully protected and preserved, and the possibility of its dilution and of the printing ink getting on the fingers of the consumer is eliminated.

Figure 6:
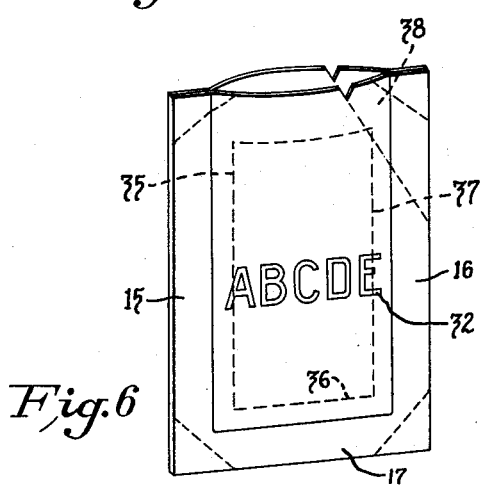
Fig. 6 is a modified form of my container in which the revenue stamp is provided all around the container.

Fig. 6 is a view similar in part to Fig. 3, the difference in construction lying primarily in the fact that in the construction of Fig. 6 the revenue stamp is provided around all edges of the package, and it may be in the form of a paper revenue stamp sealed within the walls of the package. The portions of such stamp are designated by the numerals 35, 36, 37 and 38.

While I disclose use of polyethylene and cellulose acetate plastics, it will be understood that the invention is not limited to the use of such plastics only, but other plastic materials possessing requisite properties may also be used with success. Also, the outside layer may be made of metal foil, such as aluminum foil, bonded to other material suitable to form inside walls of the package.

By virtue of the above disclosed construction, the objects of the present invention listed above and numerous additional advantages are attained.

I claim:

1. An article of manufacture, comprising a bag with all of its walls made of a pliable laminate material having an inside layer of a fusible alcohol-resisting plastic material and an outside layer of non-fibrous material of greater strength than the material of said inside layer, with said layers being bonded together to form a unitary wall structure, a quantity of alcoholic beverage sealed within said bag, and a revenue stamp sealed between said two layers in a place where it is irreparably damaged by tearing and made unusable as the bag is being opened.

2. The article of manufacture defined in claim 1, with the inner layer being made of polyethylene plastic material and the outside layer made of cellulose acetate.

3. An article of manufacture, comprising a bag with all of its walls made of a pliable laminate plastic material having an inside layer of fusible alcohol-resisting plastic material and an outside layer of transparent plastic material of greater strength than the material of said inside layer, with said layers being bonded together to form a unitary wall structure, a quantity of alcoholic beverage sealed within said bag, and a revenue stamp printed in reverse on the inner surface of said outside layer to appear direct through the transparent body thereof and at least partly within the walls of the bag which are fused together for sealing said bag.

4. An article of manufacture, comprising a bag with all of its walls made of a pliable laminate plastic material having an inside layer made of polyethylene plastic material and an outside layer of transparent plastic material of greater strength than the material of said inside layer, with said layers being bonded together to form a unitary wall structure, a quantity of alcoholic beverage sealed within said bag, and a paper revenue stamp sealed between said two layers in a place where it is torn as the container is being opened.

References Cited in the file of this patent

UNITED STATES PATENTS

| | | |
|---|---|---|
| 2,125,318 | Salfisberg | Aug. 2, 1938 |
| 2,248,266 | Abrams | July 8, 1941 |
| 2,260,064 | Stokes | Oct. 21, 1941 |
| 2,543,229 | Chapman | Feb. 27, 1951 |
| 2,584,632 | Southwick | Feb. 5, 1952 |
| 2,679,968 | Richter | June 1, 1954 |
| 2,741,402 | Sayre | Apr. 10, 1956 |

OTHER REFERENCES

Modern Packaging publication, November 1953, pp. 98–99. (Copy in Div. 40.)